Patented Nov. 1, 1938

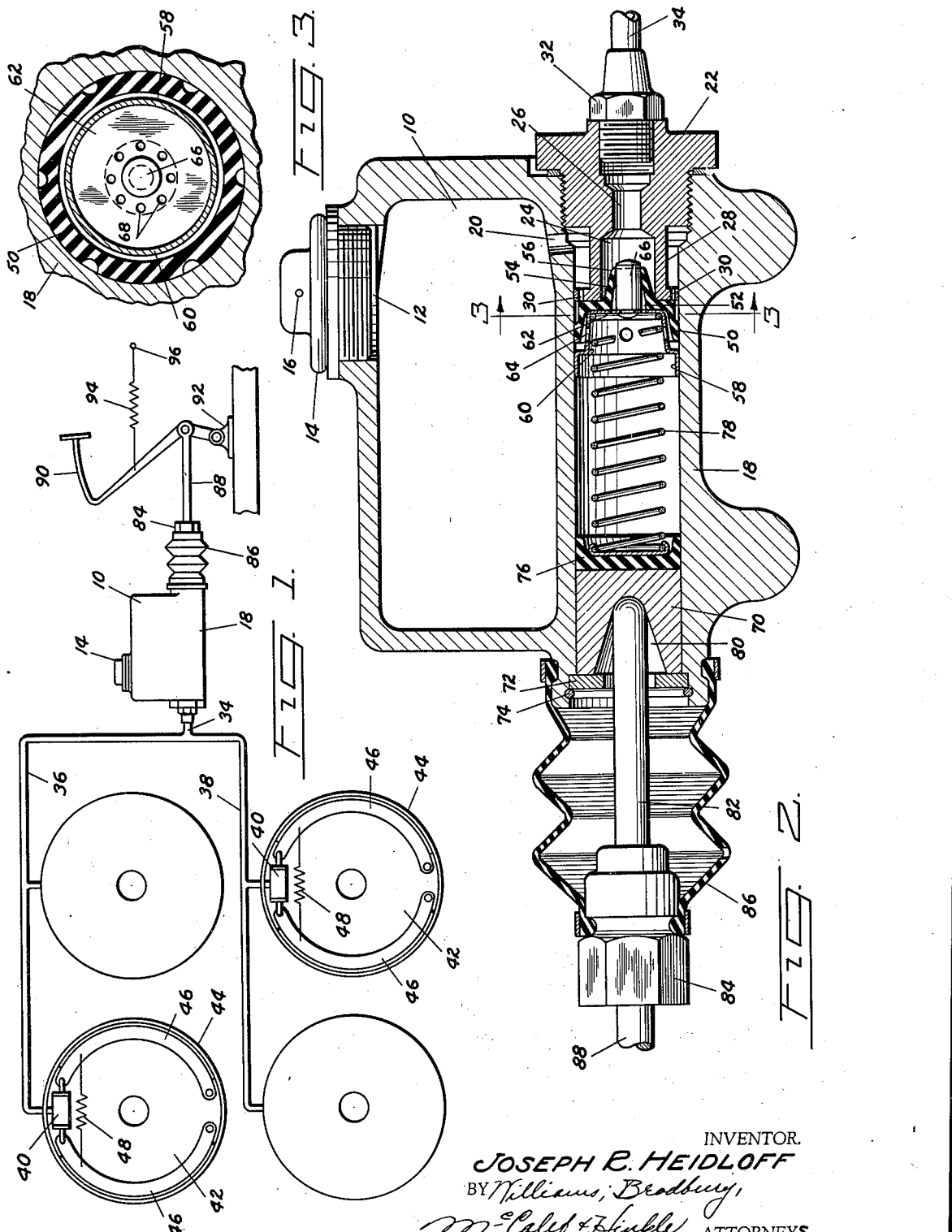

2,135,004

UNITED STATES PATENT OFFICE 2,135,004

FLUID PRESSURE BRAKE SYSTEM

Joseph R. Heidloff, Detroit, Mich., assignor to Hydraulic Brake Company, Detroit, Mich., a corporation of California Application December 14, 1935, Serial No. 54,491

4 Claims. (Cl. 60—54.6)

This invention relates to fluid pressure brake systems.

Broadly the invention comprehends a fluid pressure brake system including a fluid pressure producing device, fluid pressure actuated motors operatively connected thereto, friction elements actuated by the motors, means for supplying fluid to the system including means compensating for variations of pressure in the system, and means for actuating the device.

An object of the invention is to provide a fluid pressure system having means for imposing a predetermined pressure on a part of the system combined with means compensating for variations of pressure in the system.

Another object of the invention is to provide a fluid pressure system having a pressure producing device including a reservoir, a cylinder supplied therefrom, a piston movable in the cylinder, and means controlling the supply of fluid from the reservoir to the cylinder including means compensating for variations of pressure in the system.

Other objects of the invention will appear from the following description taken in connection with the drawing which forms a part of this specification, and in which—

Fig. 1 is a schematic view of a fluid pressure brake system embodying the invention;

Fig. 2 is a vertical sectional view of the fluid pressure producing device of the system; and Fig. 3 is a sectional view substantially on line 3—3, Fig. 1.

Referring to the drawing for more specific details of the invention, 10 represents a reservoir having a filling opening 12 which may be closed as by a plug 14 having openings 16 for venting the reservoir to the atmosphere. A cylinder 18 at the base of the reservoir has a port 20, providing communication between the cylinder and the reservoir, and a detachable head 22.

The head is threaded into the cylinder and is axially bored to provide a chamber 24 arranged concentrically of and in direct communication with the cylinder and a discharge port 26 communicating with the chamber. The head is also provided with a circumferential slot or groove 28 communicating with the port 20 and a plurality of ports 30 providing communications between the groove 28 and the cylinder.

A coupling 32 connects a fluid pressure delivery pipe or conduit 34 to the discharge port 26, and the delivery pipe has branches 36 and 38 connected respectively to fluid pressure actuated motors 40 arranged for the actuation of the brakes of a motor vehicle. The motors are arranged in pairs, one pair for actuating the brakes associated with the front wheel of a vehicle, and the other pair for actuating the brakes associated with the rear wheels of the vehicle.

The brakes may be of conventional type including a fixed support or backing plate 42, a rotatable drum 44 associated therewith, corresponding friction elements or shoes 46 pivoted on the backing plate, and a fluid pressure actuated motor corresponding to the motor 40 arranged on the backing plate between the shoes and operative to move the shoes into drum engagement against the resistance of a retractile spring 48 connecting the shoes.

A collapsible leak-proof cup 50 seated on the head 24 of the cylinder controls the ports 30. This cup is provided with a concentric opening 52, and an annular flange 54 formed on the back of the cup on the perimeter defining the opening extends into the chamber 24. This flange 54 is reduced in diameter from its base to its free edge, and the thickness of the wall of the flange is gradually reduced from its base to its free edge to provide a relatively thin lip 56.

A thimble 58 slidable in the cylinder has a reduced section 60 provided with a head 62 seated on the collapsible leak-proof cup 50, and the wall of the reduced section has spaced apertures 64 for the free passage of fluid. The head 62 supports a pin 66 which extends into the annular flange 54 past the lip 56, and the head has a plurality of relatively small openings 68 arranged in spaced relation in a circle, the center of which is in the axis of the pin.

A piston 70 reciprocable in the cylinder is retained against displacement by a washer 72 seated on an annular shoulder in the open end of the cylinder and secured in position by a retaining ring 74 seated in a groove in the wall of the cylinder. This piston has on its head a leak-proof cup 76, and a spring 78 interposed between the cup 76 and the thimble 58 serves to urge these elements to their respective seats and also to return the piston 70 to its retracted position.

The piston 70 has in its back a recess 80 receiving one end of a thrust pin 82, and on the other end of the thrust pin is a coupling 84 connected by a flexible boot 86 to the open end of the cylinder for exclusion of dust and other foreign substances from the cylinder. A rod 88 connects the coupling 84 to a foot pedal lever 90 pivoted on a suitable support 92 and connected by a retractile spring 94 to a fixed support 96.

When it is desired to apply the brakes, the operator depresses the foot pedal lever 90 and this applied force is transmitted from the foot pedal lever through the rod 88, the coupling 84 and the thrust pin 92 to the piston 70, resulting in moving the piston on its compression stroke. As the piston moves on its compression stroke, fluid is displaced from the cylinder 18 through the openings 68 in the thimble, the openings 52 in the cup 50, the annular flange 54 on the cup, past the pin 66, thence through the chamber 24, the port 26, and fluid pressure delivery pipe 34 and its branches into the fluid pressure actuated motors, energizing the motors with the resultant movement of the shoes 46 of the respective brakes into engagement with the drums 44 against the resistance of the retractile springs 48.

Upon release of the foot pedal lever 90, this lever is returned to its retracted position under the influence of the retractile spring 94, resulting in retraction of the rod 88 and the thrust pin 82 and release of the piston 70, whereupon the piston moves to its retracted position under the influence of spring 78. As the piston moves to its retracted position a vacuum is created in the cylinder 18 resulting in drawing fluid from the reservoir 10 through the port 20, the groove 28 and the ports 30 in the head of the piston, past the collapsible leak-proof cup 50 and through the openings 64 in the thimble 58 into the cylinder. During this movement fluid is returning to the cylinder 18 from the fluid pressure actuated motors 40 under the influence of retractile springs 46 connecting the shoes 46 of the respective brakes.

Pressure on the fluid returning from the motors is sufficient to lift the collapsible leak-proof cup 50 from its seat against the resistance of springs 78 so that fluid may pass the cup and circulate through the openings 64 in the thimble into the cylinder 18, also through the ports 30, the groove 28 and port 20 into the reservoir, and when the cylinder is completely filled the collapsible leak-proof cup 50 is returned to its seat under the influence of the spring 78 to maintain a predetermined pressure on the fluid in the fluid pressure delivery pipes and motors. Should any variance occur in this predetermined pressure, due to exansion or contraction of the fluid in the system, fluid will then be drawn from the reservoir, past the cup, into the cylinder, or the cup will be raised from its seat to provide for the flow of fluid to the reservoir.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising variable chamber means, a valve including a flexible cup for controlling a plurality of ports, said cup having an annular base, a marginal flange and a central flange, a metallic cup seated in the flexible cup, a pin on the metallic cup extending into the central flange, and actuating means for said variable chamber means.

2. A fluid pressure producing device comprising a cylinder having inlet and discharge ports located side by side, a piston reciprocable in the cylinder, means for actuating the piston, a flexible cup for control of the inlet and discharge ports, including an annular base, a marginal flange and a central flange, a metallic cup seated in the flexible cup, the metallic cup being of lesser diameter than the marginal flange whereby this flange may flex to permit flow of fluid from the inlet port to the cylinder, and a spring engaging the metallic cup and yieldingly holding the annular base in contact with the discharge port.

3. A fluid pressure producing device comprising a cylinder having inlet and discharge ports, a piston reciprocable in the cylinder, a flexible cup for control of the ports including an annular base, a marginal flange and a central flange protruding into the discharge port, a metallic cup seated in the flexible cup having openings for the passage of fluid, a pin on the metallic cup protruding into the central flage on the flexible cup, a spring interposed between the metallic cup and the piston, and means for actuating the piston.

4. A fluid pressure producing device comprising a reservoir, a cylinder having an inlet port providing communication between the cylinder and the reservoir and a discharge port, a flexible cup for control of the inlet and discharge ports including an annular base seated on the head of the cylinder, a marginal flange engaging the wall of the cylinder, and a central flange protruding into the discharge port, a metallic cup seated in the flexible cup having openings for the passage of fluid, a piston, a spring interposed between the metallic cup and the piston, and means for actuating the piston.

JOSEPH R. HEIDLOFF.